(No Model.)

J. J. BLACK.
VEHICLE RUNNING GEAR.

No. 392,712. Patented Nov. 13, 1888.

Witnesses,
L. P. Eldridge
E. A. Tibbitts

Inventor,
John J. Black
By his Atty, Geo. W. Tibbitts

UNITED STATES PATENT OFFICE.

JOHN J. BLACK, OF CLEVELAND, OHIO.

VEHICLE RUNNING-GEAR.

SPECIFICATION forming part of Letters Patent No. 392,712, dated November 13, 1888.

Application filed April 9, 1888. Serial No. 270,109. (No model.)

*To all whom it may concern:*

Be it known that I, JOHN J. BLACK, a citizen of the United States, residing at Cleveland, in the county of Cuyahoga and State of Ohio, have invented certain new and useful Improvements in Vehicle Running-Gear, of which the following is a specification.

This invention relates to running-gear for vehicles, and pertains to that portion commonly denominated as the "fifth-wheel," and has for its object to greatly simplify the construction and to reduce the number of parts comprising such gear, at the same time producing a more durable, better-working, and easier-managed gear. To accomplish these results I construct this portion of vehicle running-gear substantially as hereinafter described, and illustrated in the accompanying drawings, in which—

Figure 5:
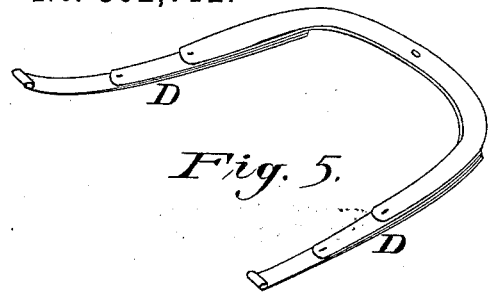
Figure 4:
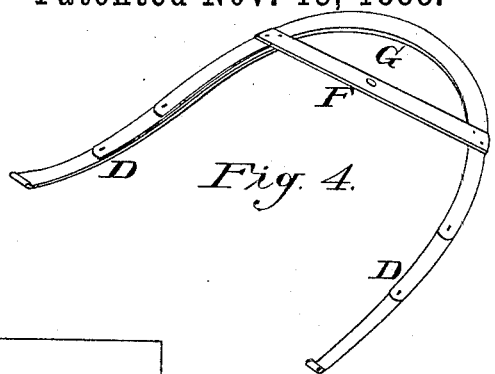
Figure 3:
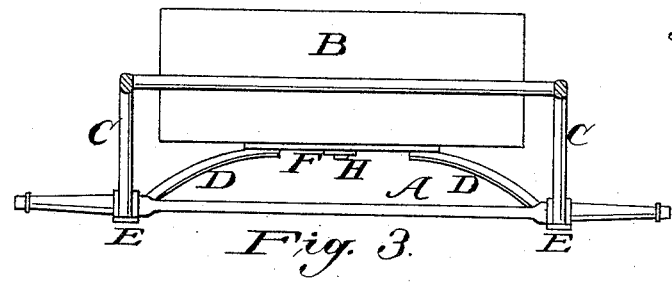
Figure 2:
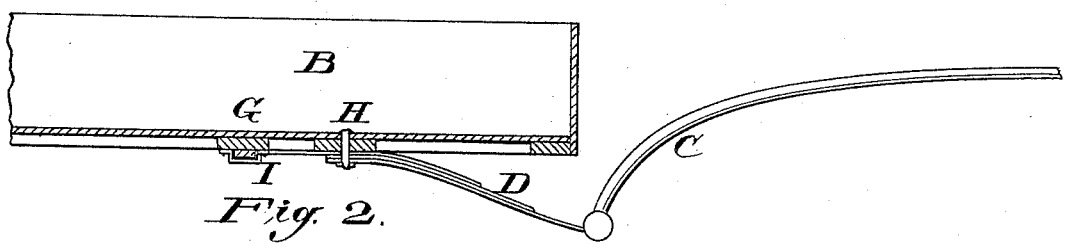
Figure 1:
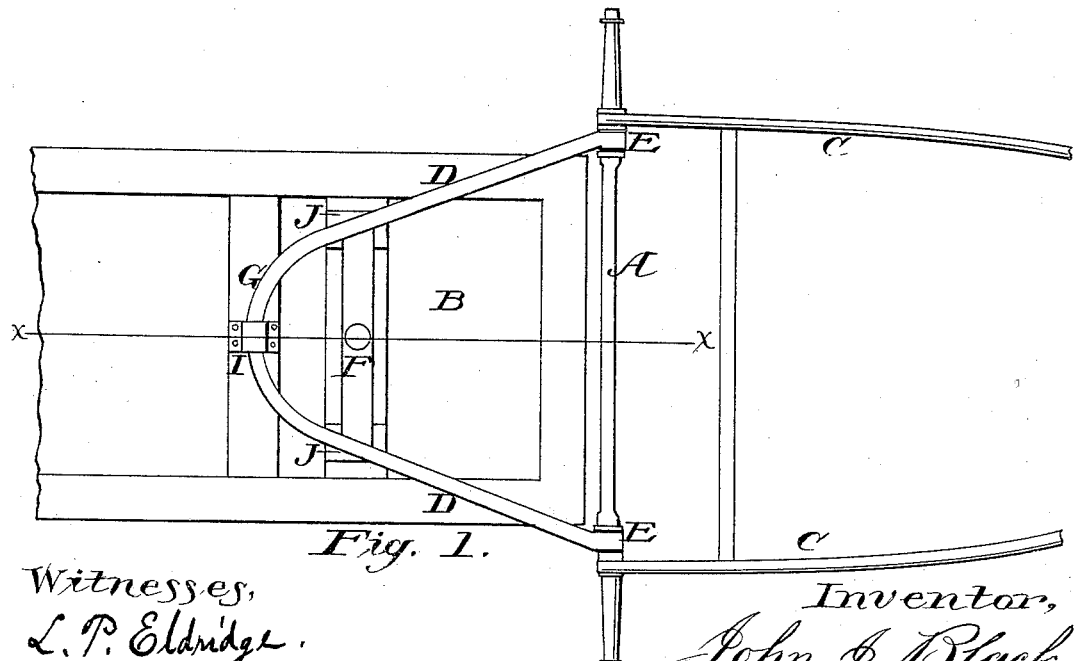

Figure 1 is an under side view of a wagon, showing my improved gear as applied thereto. Fig. 2 is a longitudinal section of the same in line $x\ x$ of Fig. 1. Fig. 3 is a front elevation of the same. Fig. 4 is a detached view of the springs and part of fifth-wheel combined. Fig. 5 is a modified form of the springs.

A represents the front axle, and B the body, of a road-wagon.

C C are the shafts used in hauling the wagon.
These shafts are shown rigidly attached to the axle by any suitable means, instead of being joined thereto by the ordinary shackles or couplings.

D D are springs attached to the axle by clips E E, having pintles passing through eyes $i\ i$ on the ends of the springs. The inner ends of the springs are joined together by a cross-bar, F, or the continuous upper leaf of the two springs, as seen in either Figs. 4 and 5. In Fig. 4 a semicircle, G, is shown, forming a rear brace or guide bar for supporting cross-bar. The cross-bar is attached to the body B by a king-bolt, H, passing through said cross-bar and a sill or strong bottom of the body.

I is a bearing-clip attached to the bottom of body, in which the semicircle rides.

Rub-plates J J may also be attached to the bottom of body or sill for the ends of cross-bar to ride upon, though these may be dispensed with when the semicircle is used.

Having described my invention, I claim—

1. The springs D D, having their rear ends joined together by cross-bar F, forming a continuous support, substantially as described.

2. In running-gear for vehicles, the combination, with axle A and body B, of the springs D D, joined by cross-bar F and connected to body by king-bolt H, substantially as described.

3. In combination, axle A, having shafts C C rigidly attached and springs pivotally attached, substantially as described.

JOHN J. BLACK.

Witnesses:
GEO. W. TIBBITTS,
C. C. SHANKLIN.